Feb. 16, 1932.　　　A. G. FAULMAN　　　1,845,834
ROTARY MOTOR
Filed Jan. 11, 1928　　2 Sheets-Sheet 1
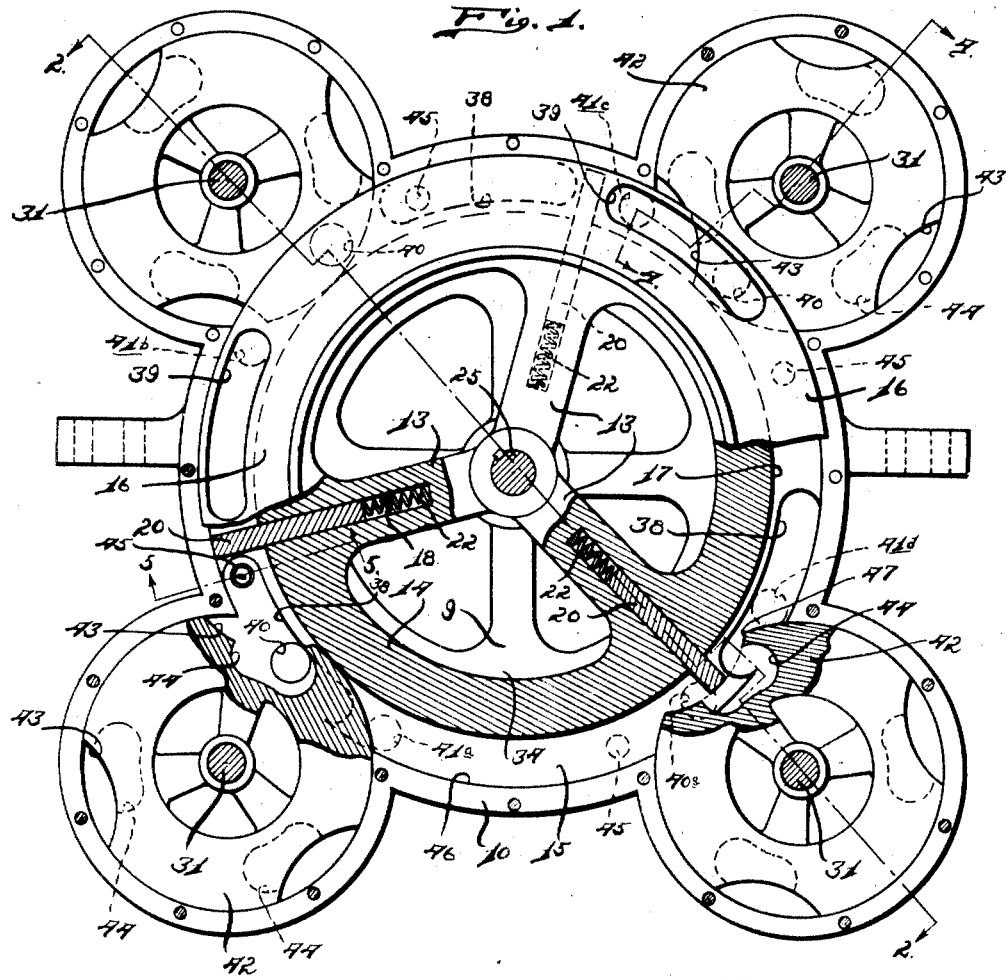
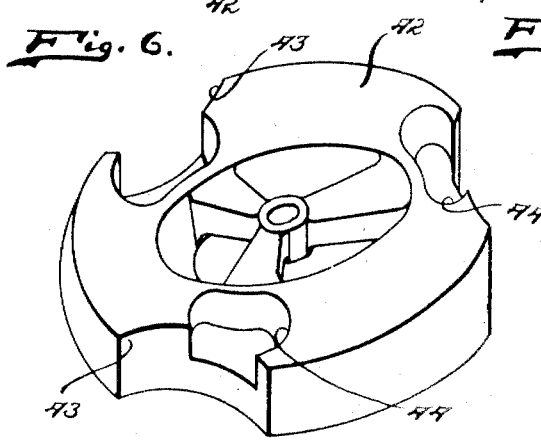
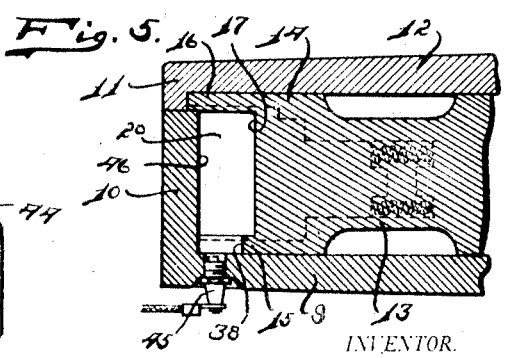
INVENTOR.
Arthur G. Faulman.
BY
Thos. S. Donnelly
ATTORNEY.

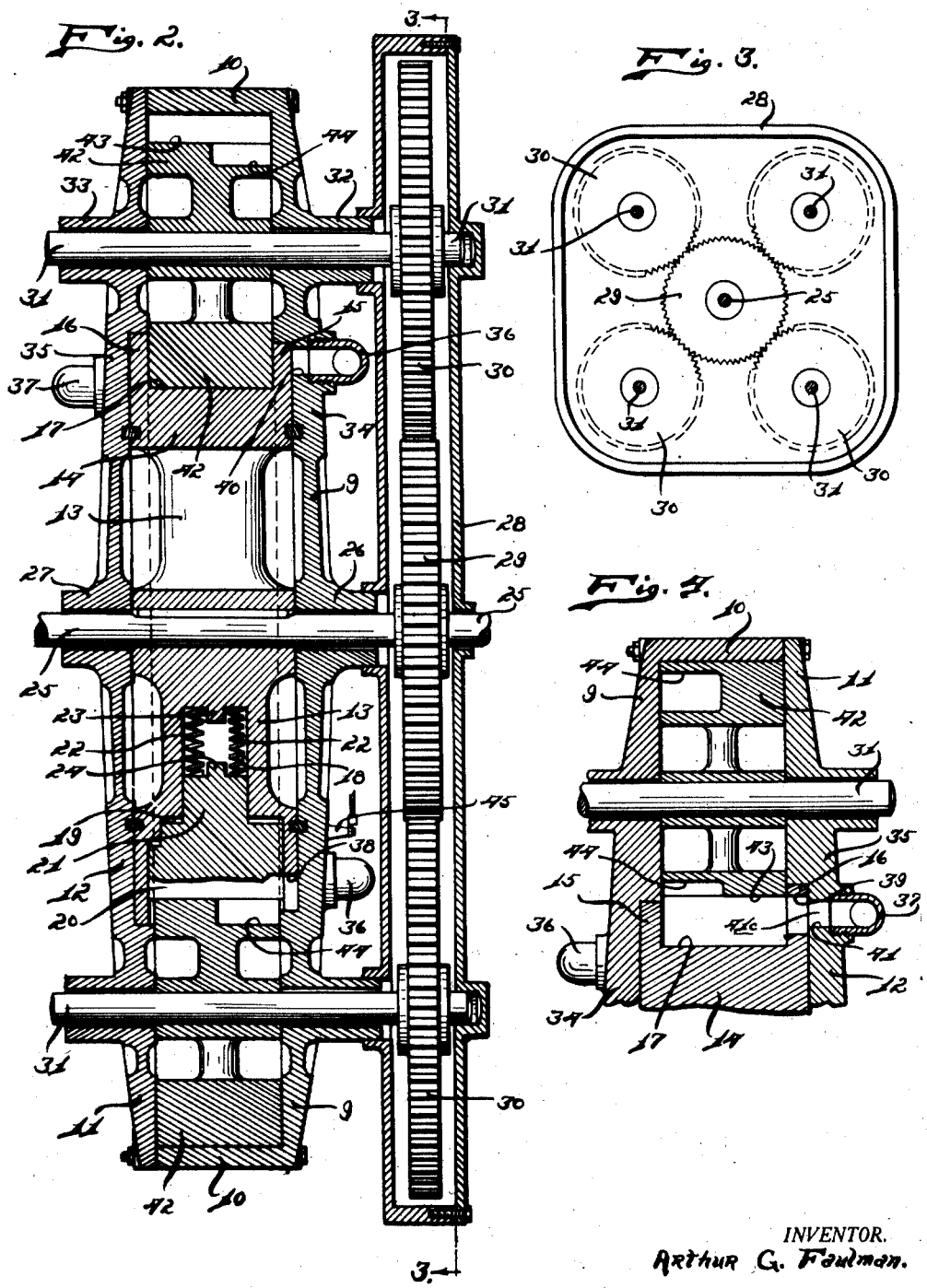

Patented Feb. 16, 1932

1,845,834

UNITED STATES PATENT OFFICE

ARTHUR G. FAULMAN, OF DETROIT, MICHIGAN

ROTARY MOTOR

Application filed January 11, 1928. Serial No. 245,822.

My invention relates to a new and useful improvement in a rotary motor, particularly of the type utilizing combustible fuel for power purposes, although from the description given it will be evident that the device may be operated with compressed air or steam with very satisfactory results.

It is an object of the present invention to provide a motor in which the efficiency of the engine will be raised to a high degree so that an economical operation of the same may be effected.

It is another object of the invention to provide a motor of this class which will be simple in structure, economical of manufacture, and highly efficient in use.

Another object of the invention is the provision in an engine of this type of a driving rotor having a plurality of rotatable reaction resistance members positioned at intervals about its periphery.

Another object of the invention is the provision of an engine of this type in which a silent operation may be effected, a plurality of impulses delivered to the rotating part during each revolution, and a maximum power produced.

Other objects will appear hereinafter.

The invention consists in the combination and arrangement of parts hereinafter described and claimed.

The invention will be best understood by a reference to the accompanying drawings which form a part of this specification and in which Fig. 1 is a side elevational view of the invention with parts broken away and parts shown in section.

Fig. 2 is a sectional view taken on line 2—2 of Fig. 1.

Fig. 3 is a view reduced in size taken on line 3—3 of Fig. 2.

Fig. 4 is a fragmentary sectional view taken on line 4—4 of Fig. 1.

Fig. 5 is a fragmentary sectional view taken on line 5—5 of Fig. 1.

Fig. 6 is a perspective view of one of the reaction resistance members used in the invention.

In the invention I provide a stator comprising the spider 9 upon which is formed, preferably integral therewith, the laterally projecting flange 10 adapted to engage the periphery 11 of a spider 12, these parts serving to form a housing for the structure. A rotor is provided formed as a wheel having the spokes 13 and the rim 14. An outwardly projecting flange 15 is formed at one side of the rim 14 and a longer outwardly projecting peripheral flange 16 is formed at the opposite side of the rim 14 so as to provide a channel 17 between these flanges 15 and 16. A radially extending passage 18 is formed in the spokes 13 communicating with the recess 19. Positioned so as to slidably engage in the recess 19 and between the flanges 15 and 16 are blades 20 having a reduced portion 21 engaging in the passage 18. Springs 22 are positioned in the passage 18 at opposite sides thereof, and adapted to engage at one end the inner face of the reduced portion 21 and at their opposite ends the base of the passage 18, a tongue 23 being formed on this base to space the springs 22 apart, a similar tongue 24 being formed on the end of the reduced portion 21. The rotor is fixedly mounted upon a drive shaft 25 which is journalled in the hub 26 and the hub 27 and extends into the housing 28. Fixedly mounted upon the shaft 25 in the housing 28 is a gear 29. This gear 29 is adapted to mesh with the gears 30 fixedly mounted upon shafts 31, these shafts projecting through hubs 32 and 33 formed in the housing and journalled therein. The portion of the spider 9 which engages the rim 14 forms a plate 34 which, together with the plate portion 35, serves as a closure for the rim 14. Secured in the plate 34 is an intake conduit 36 and an exhaust conduit 37 is secured in the plate 35.

Formed in the flange 15 are a plurality of arcuate notches 38 adapted, upon rotation of the rotor, for registering at intervals with the inlet ports 40 in the plate 34 leading to the intake conduit 36. Formed in the flange 16 are a plurality of arcuate slots 39 adapted, upon rotation of the rotor, to alternately register with the exhaust ports 41 which communicate with the exhaust conduits 37.

Fixedly mounted upon each of the shafts 31 is a reaction resistance member 42 having arcuate notches 43 formed in its periphery, each of these notches communicating with a pocket 44 formed on the face directed toward the spider 9.

Spark plugs 45 are mounted in the plate 34 at intervals, these spark plugs being suitably connected to a source of electrical energy and arranged for exploding explosive gases led into the exploding chamber.

As shown in Fig. 1, there is a space 46 between the flange 10 and the periphery of the rotor, the blades 20 being adapted, at certain positions of rotation of the rotor, for engaging the inner surface of the flange 10.

It is believed evident that a rotation of the rotor will through the operation of the gears 30 effect a rotation of the reaction resistance members 42. In the drawings I have illustrated four of these reaction resistance members, although the number may be varied at will, the number of the inlet ports being the same as the number of the reaction resistance members, as well as the number of the exhaust ports.

In operation the combustible fuel will be conducted through the intake conduit 36 under pressure to the inlet ports 40. As the rotor rotates and one of the notches 38 is brought into registration with the inlet port 40, the space between the flanges 15 and 16 will be filled with combustible fuel.

In Fig. 1 I have illustrated an intake port 40a, and as the rotor rotates so as to bring the notch 38 into registration with the inlet port 40a, the combustible fuel will begin to flow into the space between the flanges 15 and 16. At the same time, the point 47 of the reaction resistance member 42 will engage the periphery of the rim 14 so that a pocket between the point 47 and the face of the blade 20 is formed for the reception of the combustible fuel, the flanges 15 and 16 forming the side walls of this pocket. As the rotor rotates, the reaction resistance member 42 will also rotate. In this connection it will be noted that the gears 29 and 30 are of the same size so that the speed of rotation of the rotor is the same as the speed of rotation of the reaction resistance members 42, but it will also be noted that the diameter of the rotor is greater than the diameter of the reaction resistance members 42. As the rotor continues to rotate and the fuel continues to enter through the notch 38, the reaction resistance members 42 will rotate to a position where the point 47 is about to pass through the surface determined by the inner surface of the flange 10, at which time, the combustible fuel will be exploded by the spark, so that the fuel which has entered the pocket 44 will be accessible for exploding. This explosion will deliver an impulse to the face of the blade 20 and the reaction of that impulse will be sustained by the member 42 so that a rotation of the rotor in a clockwise direction may be effected, the members 42 rotating in a counter-clockwise direction. After the explosion, the rotor will continue to travel until through the slots 39 the space enclosed between the flanges 15 and 16 and the blade 20 and the member 42 will be brought into communication with the exhaust port 41a, so that the gases may be exhausted. After the member 42 has made a complete rotation, it is believed evident that the pocket 44 will contain combusted gases when the intake is being effected, but these combusted gases will serve as a cushion, it being unnecessary that the pocket 44 be utilized as a combustion chamber.

In Fig. 1 I have shown the various stages of operation, the parts being positioned on the lower right hand corner so that the intake is about to begin, this intake beginning when the slot 38 registers with the intake port 40a. The next resistance member shows the intake about to terminate so that this position is just previous to the exploding position. The next resistance member shows the position of the parts subsequent to an exploding operation, and just as the exhaust begins through the exhaust port 41b. The upper right hand resistance member illustrates the location of the parts as the exhausting operation through the exhaust port 41c is about to terminate.

In the view shown in Fig. 1, the exhaust port 41a would not appear but has been dotted in for the purpose of indicating its location. Likewise the exhaust ports 41b, 41c and 41d have also been dotted in for the same purpose.

It is believed obvious from the description given that the conduction of gases into the explosive chambers defined by the various parts illustrated and the combustion of those gases in those chambers, will effect a rotation of the rotor. It will be noted in the form given that a number of impulses are delivered to the rotor through each rotation, so that a smooth operation of the engine is effected, and an engine provided in which great power is developed. It is also believed evident that the blades 20 will move radially inwardly when engaged with the arcuate surface 43 of the reaction resistance members 42, these blades moving outwardly again into engagement with the inner surface of the flange 10 when disengaging from the members 42.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. In a rotary engine of the class described, a stator having fuel inlet ports formed therein and exhaust ports formed therein; a rotor; a peripheral flange projecting outwardly from opposite sides of said rotor, one of said flanges serving to control communication between the intake port and the space between said flanges, and the other serving to control communication of said exhaust ports and the space between said flanges, one of said flanges having a plurality of arcuate slots formed therein, and the other of said flanges having a plurality of peripheral notches formed therein; and a plurality of rotatable resistance members engageable with the periphery of said rotor between said flanges, each of said resistance members having a recess cut in its periphery communicating with a pocket in one of its faces.

2. A rotary motor of the class described, comprising: a stator; a rotor rotatably mounted in said stator; a peripheral flange on opposite sides of said rotor in spaced relation; a fuel conduit for delivering combustible fuel into the space between said flanges; radially movable blades on said rotor for dividing the space between said flanges into sections; means movable into the space between said flanges in each of said sections for forming a reaction resistance member upon explosion of the combustible fuel delivered into said sections, said reaction resistance member having a plurality of notches formed in its periphery, each communicating with a pocket in one of the side faces; and means for rotating said reaction resistance member in unison with and at the same speed as said rotor, said notches serving as engagement members for said blades during passage of the same past said notches.

3. A rotary motor of the class described comprising: a stator; a plurality of housings mounted on said stator, each communicating therewith at one side thereof; a rotor rotatably mounted in said stator; a plurality of radially movable plates on said rotor; a peripherally projecting flange on each end face of said rotor, the end edges of said plates engaging the inner faces of said flanges, one of said flanges having arcuate slots formed beyond the periphery of said rotor between said plates and the other having a plurality of elongated notches formed beyond the periphery of said rotor and between said plates; a fuel delivery conduit communicating with the interior of said stator; a rotatable member mounted in each of said housings and provided on its periphery with a plurality of notches, each of said notches communicating with a pocket on one of its faces, said pockets being adapted for the reception of fuel from said conduit.

4. A rotary motor of the class described comprising: a stator; a plurality of housings mounted on said stator, each communicating therewith at one side thereof; a rotor rotatably mounted in said stator; a plurality of radially movable plates on said rotor; a peripherally projecting flange on each end face of said rotor, the end edges of said plates engaging the inner faces of said flanges, one of said flanges having arcuate slots formed beyond the periphery of said rotor between said plates and the other having a plurality of elongated notches formed beyond the periphery of said rotor and between said plates; a fuel delivering conduit communicating with the interior of said stator; a rotatable member mounted in each of said housings and provided on its periphery with a plurality of notches, each of said notches communicating with a pocket on one of its faces, said pockets being adapted for the reception of fuel from said conduit; and means for rotating said rotor and said rotatable members in said housing in coordination with each other, the location of said notches on said rotatable members being determined by the position of said slots and notches on said flanges.

In testimony whereof I have signed the foregoing specification.

ARTHUR G. FAULMAN.